Aug. 13, 1935.    G. PLEPP    2,011,160
MANUFACTURE OF ARTIFICIAL SPONGE
Filed Oct. 9, 1933
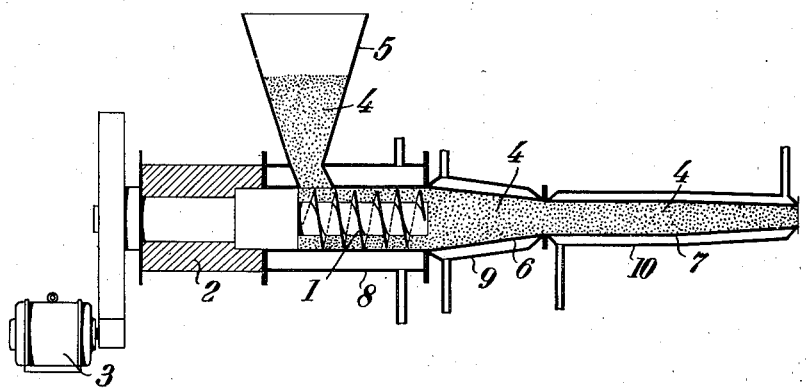
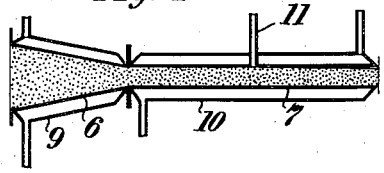
Inventor:
Gaston Plepp,
By   Attorneys
Potter, Pierce & Scheffler Patented Aug. 13, 1935

2,011,160

UNITED STATES PATENT OFFICE 2,011,160

MANUFACTURE OF ARTIFICIAL SPONGE

Gaston Plepp, Wolfen Kreis Bitterfeld, Germany, assignor to Winthrop Chemical Company, Inc., New York, N. Y., a corporation of New York Application October 9, 1933, Serial No. 692,899
In Germany October 12, 1932

4 Claims. (Cl. 18—48)

My present invention relates to the manufacture of artificial sponge and more particularly to the manufacture of artificial sponges from viscose.

One of its objects is to provide a process of continuously manufacturing artificial sponges from viscose. Another object is an apparatus for carrying out this process. Further objects will be seen from the detailed specification following hereafter. Reference is made to the accompanying drawing in which Fig. 1 shows diagrammatically an apparatus for carrying out my process of continuously manufacturing artificial sponges, Fig. 2 shows diagrammatically a modified apparatus for continuously producing artificial sponge, and Figs. 3 to 5 show varying cross-sections of the tube which is used for the production of the artificial sponge.

In the known processes of making artificial sponges from viscose, described, for instance, in U. S. Patent No. 1,611,056, and U. S. Patent No. 1,909,629, the paste of viscose salt and fiber used as the sponge-forming mass is generally pressed into containers wherein the pieces thus shaped are subjected to coagulation by treatment with heat, salt solutions, acid solutions or the like.

The raw sponge mass pressed into containers cannot be removed therefrom for the purpose of coagulating it, because it cannot be detached from the walls of the container, and the shaped pieces, produced by removing the walls of the container do not preserve their form, because of the excessive softness of the mass. Owing to this behavior the attempt to manufacture viscose-sponges in continuous operation has encountered difficulties not so far overcome.

According to this invention sponges of viscose are made in a continuous operation by advancing and coagulating the sponge mass in heated tubes. The tubes may be made of any suitable material which does not chemically interact with the sponge mass. Iron tubes may also be used, but are not particularly suitable. The best results have been obtained with tubes of nickel, particularly with tubes of rust proof steel, for instance, such as is known under the trade-marks $V_{2a}$ and $V_{4a}$.

The uncoagulated sponge mass, including the salt that forms the pores and the fibrous material, is pressed by means of a suitable press, for instance, a worm press or a piston press, into a tube having a cross-section corresponding with the required shape of the sponge. While it is in the first part of the tube which preferably has a conical form with a diameter that decreases as its distance from the pump increases, the sponge mass is preferably cooled from outside, in order to retard the coagulation so long as the particles of the mass may be displaced relatively by the applied pressure. After the mass is no longer deformed by the pressure it is merely advanced within the tube by the mass which is continuously supplied by the pump, and arrives at a zone of the tube which is heated to about 120 to 300° C., according to the heated length of the tube, for instance, by means of superheated steam or by means of an oil bath or any other suitable means. The heat which penetrates into the interior of the sponge mass, causes the coagulation of the viscose. The heated part of the tube is given such a length, that the sponge mass which corresponds with the cross-section of the tube may have the form of a band or a rod arrives at the end either completely coagulated or coagulated to such a depth that its form is stable, so that it can be finished by a suitable after-coagulation, without deforming the shaped pieces.

The coherent sponge mass issuing from the heated tube may then be freed from salt by means of hot water, and may then be treated in the required cleansing baths, for instance, in desulfurizing baths and bleaching baths. While in these baths, or while passing from one bath to another, the continuous product may be guided between squeezing rollers or be subjected to any kneading operation in order to obtain a better penetration of the cleansing liquids.

If the sponge mass is not completely coagulated in the heated part of the tube, it may be after-coagulated prior to the washing baths, for instance, by means of steam or in a hot salt bath. As the sponge mass is subject to shrinking in the hot part of the tube and will no longer fill the tube completely, it is possible to assist the transmission of heat during the coagulation by introducing steam into the tube at the part where the mass detaches itself from the wall or to provide a corresponding reduction of the cross-section of the tube.

Either after the after-treatment, while in a dry or wet condition, or immediately after the coagulation is complete, the product which has the form of a band may be reduced to pieces by cutting it transversely.

The artificial sponges produced by the process of this invention have remarkably improved quality. Thus the tensile strength as well as the uniformity of the product are greatly enhanced. By the sliding of the mass on the hot wall of the tube, the surface of the sponge becomes somewhat roughened. This involves considerable advantages for the application of the sponges. Thus by means of the present process, it is possible to give the surface the aspect of deer-skin.

The continuous method of production according to this invention is much more efficient than those hitherto known for the manufacture of artificial sponges from viscose. Furthermore it is not necessary to stock a large number of molds and the alternating filling and emptying of the coagulation chambers, involving considerable time and labor, can be dispensed with. Moreover the after-treatment and the finishing treatment are rendered very simple and easy. All the salt in the first washing liquors can easily be recovered. This was not profitable with the hitherto used methods.

The following example serves to illustrate the invention.

200 kilos of an unripened viscose (made from unripened alkali cellulose) containing 5% of NaOH and 6% of cellulose (ripeness: 45 cc. of a solution of ammonium sulfide of 15% strength) and a viscosity of 100 seconds determined in the ball viscosimeter 100 seconds representing the time taken for a steel ball of 3 mm. diameter to sink through a column of the viscose of 20 cm. height at a temperature of 20° C. are mixed with a suitable fibrous material, for instance, hemp or flax as a binding agent in a suitable apparatus, for instance an agitator. The mass obtained is then mixed in a kneading machine with an easily soluble or easily melting substance or salt, for instance, sodium sulfate. The proportion of salt is adjusted according to the required porosity and amounts to about three times the weight of the employed viscose. The incorporation of the salt must not occupy too long a time and should be done while cooling, so that the temperature does not exceed 20° C. The mass thus produced is pressed through a mold of suitable cross-section by means of a worm or a piston while cooling the mass to a temperature not exceeding 20° C. in the press and on the first, conical part of the mold having a length of about 30 to 100 cm. The following part of the form has an oval cross-section 150 mm. high and 50 mm. broad, is 3 m. long and heated to 150 to 200° C. The sponge mass is pressed through the mold at a speed of 1 m. per 10 minutes. The sponge is then completely coagulated and freed from salt and other matter soluble in hot water.

If the coagulation is effected in a shorter tube and at a lower temperature of about 100 to 120° C. the sponge mass has a stable form but it must be subjected to an after-coagulation in a hot salt solution.

The invention will now be described with reference to the accompanying drawing. Referring to Fig. 1, the worm gear 1 is journalled in the bearing 2 and driven by the motor 3. The raw sponge mass 4 obtained by mixing viscose with a fibrous material and a pore forming material is supplied to the worm gear through the funnel 5. The worm gear advances the mass 4 through the cone shaped tube 6 to the tube 7 in which the coagulation occurs. The worm gear and the conical tube are surrounded by jackets 8 and 9 for cooling these parts by means of a suitable liquid. The tube 7 is surrounded by a jacket 10 for passage of a heated medium which effects the coagulation. As shown in Fig. 1 the tube 7 is somewhat tapered to its discharge end so that over its whole length it is in contact with the coagulating mass which contracts somewhat during coagulation. In Fig. 2 the tube 7 is not tapered, but has a branch 11 through which steam can be introduced at the place where contracting of the mass begins, in order to promote or complete the coagulation. Figs. 3 to 5 show different cross-sections of the tube 7 for giving the finished product the desired shape.

What I claim is:

1. The process of continuously producing artificial sponge which comprises mixing viscose with a fibrous material and a pore forming material, pressing the raw sponge mass thus produced through a tube, cooling said tube on a first part and heating said tube on a second part to such a temperature that the sponge mass leaves the tube substantially coagulated.

2. The process of continuously producing artificial sponge which comprises mixing viscose with a fibrous material and a pore forming material, pressing the raw sponge mass thus produced through a tube, cooling said tube on a first part so that the temperature does not exceed 20° C. and heating said tube on a second part to 120 to 300° C. so that the sponge mass leaves the tube substantially coagulated.

3. The process of continuously producing artificial sponge which comprises mixing viscose with a fibrous material and a pore forming material, pressing the raw sponge mass thus produced through a tube, cooling said tube on a first part of about 30 to 100 cm. length so that its temperature does not exceed 20° C. and heating said tube on a second part of 3 m. length to 150 to 200° C.

4. The process of continuously producing artificial sponge which comprises mixing viscose with a fibrous material and a pore forming material, pressing the raw sponge mass thus produced through a tube, cooling said tube on a first part, heating said tube on a second part, so as to partly coagulate said sponge mass, and subjecting the partly coagulated mass to an after-coagulation.

GASTON PLEPP.